United States Patent [19]
Oita et al.

[11] Patent Number: 5,683,805
[45] Date of Patent: Nov. 4, 1997

[54] COLORED FILM

[75] Inventors: Katsuyuki Oita; Kohei Tachikawa, both of Tokyo, Japan; Leonardo M. Garcia, Woburn, Mass.; Chandrakant C. Patel, Woburn, Mass.; Toshio Minagawa, Woburn, Mass.

[73] Assignee: Lintec Corporation, Tokyo, Japan

[21] Appl. No.: 616,460

[22] Filed: Mar. 15, 1996

[30] Foreign Application Priority Data

Oct. 27, 1995 [JP] Japan ................... 7-302319

[51] Int. Cl.$^6$ .......................................... C09J 7/02
[52] U.S. Cl. .................. 428/343; 428/349; 428/355 AC
[58] Field of Search .................... 428/343, 354, 428/355, 355 AC, 349

[56] References Cited

U.S. PATENT DOCUMENTS

| | | | |
|---|---|---|---|
| 3,884,505 | 5/1975 | Miller | 428/908 |
| 3,887,742 | 6/1975 | Reinnagel | 428/211 |
| 4,797,317 | 1/1989 | Oliver | 429/354 |

*Primary Examiner*—Jenna Davis
*Attorney, Agent, or Firm*—Oblon, Spivak, McClelland, Maier & Neustadt, P.C.

[57] ABSTRACT

Described is a colored film formed of a transparent film and at least one colored adhesive layer arranged on one side of the transparent film. The adhesive layer has been colored by a colorant composed of a pigment and a dispersant. The dispersant comprises a (meth)acrylate ester polymer formed, as essential monomer components, of an aromatic vinyl monomer, a primary to tertiary amino-containing (meth) acrylate ester monomer and a (meth)acrylate ester monomer containing an ammonium group quaternized with an aromatic compound.

11 Claims, 1 Drawing Sheet

COLORED FILM

BACKGROUND OF THE INVENTION

1. Field of the Invention

The present invention relates to a colored film, and more specifically to a colored film excellent in vividness, transparency, light resistance, color fastness, stability and the like.

2. Description of the Related Art

Colored films have been used widely for many years, for example, in vehicles and buildings and as packaging materials and sign materials. Colored films are required to have excellent vividness, transparency, light resistance, color fastness, stability and the like when used for the purpose of ornamentation, selective transmission of incident light of a particular wave-length, prevention of see-through from the outside, or the like, for example, for solar control. These colored films are also required to permit easy adhesion and peeling so that transparent films are provided on one side thereof with a layer of a pressure-sensitive adhesive, a heat-sensitive adhesive or an autohesive (a material which has no surface tackiness but can be adhered making use of mirror-surface air tightness between the surface of the adhesive and a smooth surface such as that of a glass plate, metal plate or a plastic plate, a coated surface or the like, which will hereinafter be referred to simply as "autohesive").

For coloring a transparent film, a dye soluble in an adhesive has been used because of the need for the retention of transparency. Coloration of a transparent film itself with a dye is not impossible but is extremely difficult, so that coloration is principally effected to such a pressure-sensitive adhesive, heat-sensitive adhesive or autohesive portion.

According to the above conventional technique, coloring of an adhesive with a dye is easy and a colored film excellent in vividness and transparency can be obtained. This technique is however accompanied with a drawback that, when the colored film so obtained is used under conditions exposed to external light like a solar control film by way of example, fading or discoloration of the film occurs with the passage of a certain time because of the inferior light resistance of the dye. With a view toward overcoming these problems, various techniques which use a pigment instead of the dye have hence been proposed. Although these conventional techniques can provide colored films having excellent light resistance, difficulty is involved in finely dispersing a pigment in an adhesive. Even if the pigment can be dispersed, severe cohesion of particles of the pigment occurs, thereby failing to obtain colored films satisfactory in vividness and transparency.

SUMMARY OF THE INVENTION

An object of the present invention is therefore to provide a film colored with a pigment and having excellent vividness, transparency, light resistance, color fastness, stability and the like.

The above object can be attained by the present invention to be described below. The present invention therefore provides a colored film formed of a transparent film and at least one colored adhesive layer applied on one side of the transparent film. The adhesive layer has been colored by a colorant composed of a pigment and a dispersant. The dispersant comprises a (meth)acrylate ester polymer formed, as essential monomer components, of an aromatic vinyl monomer, a primary to tertiary amino-containing (meth) acrylate ester monomer and a (meth)acrylate ester monomer containing an ammonium group quaternized with an aromatic compound.

According to the present invention, the (meth)acrylate ester polymer having aromatic groups, primary to tertiary amino groups and quaternized ammonium groups as pendants is excellent as a dispersant for use in dispersing the pigment in the adhesive. The present invention therefore makes it possible to provide a colored film having excellent vividness, transparency, light resistance, stability and the like which cannot possibly be obtained by any conventional technique.

DETAILED DESCRIPTION OF THE PREFERRED EMBODIMENTS

Figure 1:
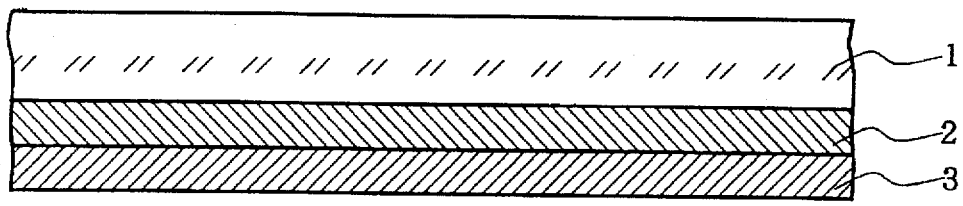
FIG. 1 schematically illustrates a cross-section of a colored film according to one embodiment of the present invention.

The present invention will hereinafter be described more specifically by preferred embodiments.

The colored film according to the present invention comprises a transparent film, an adhesive and a coloring pigment with which the adhesive is colored. The dispersant for the coloring pigment is composed of a (meth)acrylate ester polymer comprising, as essential monomer components, an aromatic vinyl monomer, a primary to tertiary amino-containing (meth)acrylate ester monomer and a (meth) acrylate ester monomer having an ammonium group quaternized with an aromatic compound.

As a transparent film for use in the present invention, any transparent film used in the conventional colored films can be employed. Examples include a polyethylene film, polypropylene film, polyester film, polycarbonate film, polyvinyl chloride film, polyvinylidene chloride film, polystyrene film and polyamide film. No particular dimensional limitation is imposed on the film. Although its thickness varies depending on the application purpose, a film or sheet of about 6 to 200 μm in thickness is generally used.

Adhesives usable in the present invention may embrace pressure-sensitive adhesives, heat-sensitive adhesives and autohesives.

Examples of the pressure-sensitive adhesives include various ones known to date such as those of the acrylic type, rubber-based type, polyvinyl ether type and silicone type. An acrylic pressure-sensitive adhesive, for example, can be obtained by copolymerizing in an organic solvent an alkyl-containing (meth)acrylate ester and a polymerizable unsaturated carboxylic acid or an ethylenically unsaturated hydroxyl-containing monomer, and optionally a copolymerizable vinyl monomer. There are a number of such known pressure-sensitive adhesives. They are commercially available under various trade names and are usable in the present invention.

The term "heat-sensitive adhesive" as used herein means an adhesive which has no adhesiveness at room temperature but exhibits adhesiveness when heated. It is also called a "hot-melt adhesive" or "heat-sealing agent". They are both formed of a thermoplastic resin as a principal component and are called a "hot-melt adhesive" and a "heat-sealing agent" according to their application methods, respectively. Examples of the heat-sensitive adhesive include those containing as a base polymer an ethylene-vinyl acetate copolymer, an ethylene-ethyl acrylate copolymer, an ethylene-acrylic acid copolymer, a polyamide resin, a polyester resin, a rubbery styrene-butadiene-styrene copolymer, a rubbery styrene-isoprene-styrene copolymer or the like. Such heat-sensitive adhesives are known in a large number. They are commercially available under various trade names and are all usable in the present invention.

The term "autohesive" as used herein means an adhesive (autohesive) which can adhere to an object, which has a smooth surface by making use of air tightness available between mirror surfaces, that is, the smooth surface of the object and a surface of the adhesive (autohesive). The transparent sheet with the autohesive applied thereon can be easily peeled without staining the transparent sheet itself and/or the object, and moreover, can be repeatedly adhered. Examples of the autohesive include those containing as a base polymer an ethylene-base copolymer such as an ethylene-vinyl acetate copolymer or ethylene-ethyl acrylate copolymer, an ethylene-α-olefin copolymer, a soft vinyl chloride resin, an acrylic resin, a rubber-base resin, a urethane resin or an olefin resin.

The colored film according to the present invention can be obtained by coloring the adhesive with a coloring pigment, which will be described subsequently herein, in advance and then coating a transparent film with the resulting colored adhesive to a predetermined thickness by an appropriate coating method.

The dispersant used in the present invention has the (meth)acrylate ester polymer as its backbone which carries aromatic groups, primary to tertiary amino groups and quaternized ammonium groups as pendants, i.e., side chains.

The dispersant can be prepared in accordance with one of the following methods:

(1) The essential monomer components are polymerized, followed by the quaternization of a portion of the primary to tertiary amino groups in the resulting polymer.

(2) The primary to tertiary amino-containing (meth) acrylate ester monomer is provided in a quaternized form and is then copolymerized with the remaining monomers.

Examples of the aromatic vinyl monomer which is one of the essential monomer components for the dispersant include styrene, α-methylstyrene, vinyltoluene, vinylnaphthalene, vinylanthracene, vinylanthraquinone, (meth)acrylamides of aromatic amines, and (meth)acrylates of hydroxyl-containing aromatic compounds. Illustrative of the aromatic amines include aniline, benzylamine, naphthylamine, aminoanthracene, aminoanthraquinone and derivatives thereof. Examples of the hydroxyl-containing aromatic compounds include hydroxyl-containing compounds corresponding to the above amino compounds.

In the above dispersant, the proportion of the aromatic vinyl monomer varies depending on its aromatic group and cannot therefore be determined in a wholesale manner. In general, the aromatic vinyl monomer may however be used in a proportion amounting to 10–60 parts by weight, preferably 20–50 parts by weight per 100 parts by weight of the polymer.

If the content of the aromatic vinyl monomer is less than 10 parts by weight, the resulting dispersant does not have sufficient improving effects on the dispersibility of the pigment. If the content exceeds 60 parts by weight, on the other hand, the resulting dispersant has an unduly high Tg and also has lowered compatibility with a material to be colored, thereby causing an uneven color shade in the colored material in some instances.

Examples of the primary to tertiary-amino-containing (meth)acrylate ester monomer, which is another essential monomer component, include N-alkylaminoalkyl (meth) acrylates, N,N-dialkylaminoalkyl (meth)acrylates, γ-(N-alkylamino)-β-hydroxy-propyl (meth)acrylates, γ-(N-dialkylamino)-β-hydroxy-propyl (meth)acrylates, γ-(N,N-dialkylamino)-β-hydroxy-propyl (meth)acrylates and N,N-dialkylaminoalkyl (meth)acrylamides. The alkyl groups in these monomers may be $C_{1-20}$ alkyl groups, preferably $C_{1-6}$ alkyl groups.

In the above dispersant, the proportion of the primary to tertiary amino-containing (meth)acrylate monomer varies depending on the other monomers and cannot therefore be determined in a wholesale manner. In general, the primary to tertiary amino-containing acrylate monomer may be used in a proportion amounting to 2–15 parts by weight, preferably 5–10 parts by weight per 100 parts by weight of the polymer.

If the content of the primary to tertiary amino-containing (meth)acrylate monomer is less than 2 parts by weight, the resulting dispersant has insufficient wetness to the pigment. If the content exceeds 15 parts by weight, on the other hand, the hydrophilic property of the resulting dispersant becomes so high that the compatibility with hydrophobic ink media, paint media and various resins is reduced.

In the dispersant, the quaternized ammonium-containing (meth)acrylate monomer, which is a further monomer component, is a quaternized product of the primary to tertiary amino-containing (meth)acrylate monomer. Although alkyl halides such as methyl chloride, methyl bromide, methyl iodide, ethyl chloride, ethyl bromide and ethyl iodide can be used as quaternizing agents, preferred examples are aromatic compounds, specifically benzyl chloride, benzyl bromide, benzyl iodide, chloromethylnaphthalene, bromomethylnaphthalene, iodomethylnaphthalene and derivatives thereof.

Use of a (meth)acrylate ester monomer quaternized by one of the above-exemplified aromatic compounds can provide more improved dispersibility for the pigment. Incidentally, the introduction of these quaternized ammonium groups into the polymer can be achieved by first polymerizing the monomer composition and then quaternizing the primary to tertiary amino groups in the resulting polymer to a predetermined extent or by conducting polymerization using the primary to tertiary amino-containing (meth)acrylate ester monomer in a quaternized form.

In the above dispersant, the proportion of the quaternized-ammonium-containing (meth)acrylate ester monomer varies depending on the other monomers and cannot therefore be determined in a wholesale manner. In general, the quaternized-ammonium-containing (meth)acrylate ester monomer may be used in a proportion amounting to 1 to 10 parts by weight, preferably 3 to 8 parts by weight per 100 parts by weight of the polymer.

If the content of the quaternized-ammonium-containing (meth)acrylate ester monomer is less than 1 part by weight, the resulting dispersant can have neither sufficient wetting property nor sufficient dispersion stability for the pigment. If the content exceeds 10 parts by weight, on the other hand, the hydrophilic property of the resulting dispersant becomes so high that the compatibility with hydrophobic ink media, paint media and various resins is reduced.

In the present invention, one or more additional monomers can be copolymerized with the above-described monomers depending on the kind of the pigment, the quality of the material to be colored or the like. Any monomers can be employed insofar as they are copolymerizable with the above-described monomers. Examples include (meth) acrylic acid, itaconic acid, maleic acid, fumaric acid and the like; $C_{1-20}$ alkyl (such as methyl, ethyl, propyl, butyl, pentyl, cyclohexyl and the like), aryl and arylalkyl esters of such unsaturated acids; monoesters between (meth)acrylic acid and polyols such as ethylene glycol, diethylene glycol, triethylene glycol, tetramethylene glycol, polyethylene glycol, propylene glycol, dipropylene glycol, polypropylene glycol, 1,3-pentanediol, 1,4-butanediol, 1,6-hexanediol, glycerine and diglycerine; alkoxyethyl (meth)acrylates; vinyl acetate; (meth)acrylonitrile; (meth)acrylamide; vinyl chloride, vinylidene chloride and vinylpyridine.

In the above dispersant, the total proportion of the copolymerizable monomer or monomers varies depending on the other monomers and cannot therefore be determined in a wholesale manner. In general, the copolymerizable monomer or monomers may be used in a total proportion amounting to 0 to 70 parts by weight, preferably 30 to 60 parts by weight per 100 parts by weight of the polymer. As these copolymerizable monomers, it is preferred to use hydrophobic monomers or hydroxyl-containing monomers.

The dispersant can be obtained by a conventionally-known mixed polymerization process, for example, solution polymerization, suspension polymerization or emulsion polymerization, of the monomers combined at a predetermined ratio or added successively with the progress of polymerization. It is to be noted that, when a hydroxyl-terminated polymer is required, the monomers other than the hydroxyl-containing monomer are polymerized in advance and the resulting polymerization mixture is then subjected to further polymerization while adding the hydroxyl-containing monomer dropwise.

The molecular weight of the polymer can be adjusted properly as needed by using a known additive such as a polymerization modifier, chain transfer agent or the like. No particular limitation is imposed on the molecular weight of the dispersant so obtained but in view of the dispersibility of the pigment and the viscosity of the resulting colorant, it may preferably range from about 1,000 to 100,000, more preferably from 3,000 to 50,000.

Known pigments which have been conventionally used in various fields are all usable in the present invention. Specific examples include organic pigments such as phthalocyanine, azo, condensed azo, azo lake, anthraquinone, perylene/ perinone, indigo/thioindigo, isoindolinone, azomethineazo, dioxazine, quinacridone, aniline black, triphenylmethane and carbon black pigments; and inorganic pigments such as titanium oxide, iron oxide, iron hydroxide, chrome oxide, spinel-form calcination type, chromic acid, chrome vermilion, iron blue, aluminum powder and bronze powder pigments. These pigments may be provided in any form or may be subjected in advance to various dispersion treatment in a manner known per se in the art.

The colorant employed in the present invention can be obtained by kneading the dispersant and the pigment in a kneader such as a sand grinding mill, ball mill, attritor mill: triple roll mill or the like. The dispersant may be used in a proportion of about 10 to 500 parts by weight per 100 parts by weight of the pigment. Upon kneading the dispersant with the pigment, the dispersant (optionally, together with an appropriate amount of an organic solvent) is mixed in, for example, a powdery pigment and the resulting mixture is then mixed and kneaded, for example, in a triple roll mill, whereby a colorant containing very little cohered pigment particles and having excellent transparency can be obtained. The colorant so obtained can be provided in any form, for example, as powder, chips, a paste containing an organic solvent or a liquid containing an organic solvent as a medium. No particular limitation is imposed on the form of the colorant insofar as it is suited for the coloring purpose.

Depending on the material to be colored, the colorant can be added with one or more of various additives such as organic solvents, film-forming resins (in not a large proportion), flame retardants, antioxidants, ultraviolet absorbers, plasticizers and surfactants.

The coloring of the adhesive with the colorant may be performed by mixing them together, optionally in the presence of water or an organic solvent, followed by thorough mixing under agitation. The colorant has properties for which it can readily and stably disperse in the adhesive or a solution thereof, so that it requires no special treatment. The pigment can, however, be dispersed completely by kneading the mixture of the colorant and the adhesive in a kneader such as a sand grinding mill, ball mill, attritor mill or triple roll mill. The colorant may preferably be used in a proportion ranging from 0.1 to 10 parts by weight per 100 parts by weight of the adhesive, that is, from 0.1 to 5 parts by weight as calculated based on the pigment. An unduly low concentration of the pigment cannot provide sufficient coloring power, whereas an excessively high concentration of the pigment may lead to insufficient transparency and/or light transmission in some instances.

Typical embodiments of the colored film according to the present invention will now be described.

In the embodiment shown in FIG. 1, a layer 2 formed of the colored pressure-sensitive adhesive or colored autohesive is formed on a surface of a transparent film 1. In this form, the pressure-sensitive adhesive has tackiness at room temperature so that a release paper or sheet 3 is applied to a surface of the adhesive layer 2 to overcome such inconvenience. Upon application of the colored film, for example, on a glass pane of an automobile, the film is adhered to the window after or while the top release paper or sheet 3 is peeled. Where the layer 2 is formed of the colored autohesive, the release paper 3 can be applied as needed.

Figure 2:
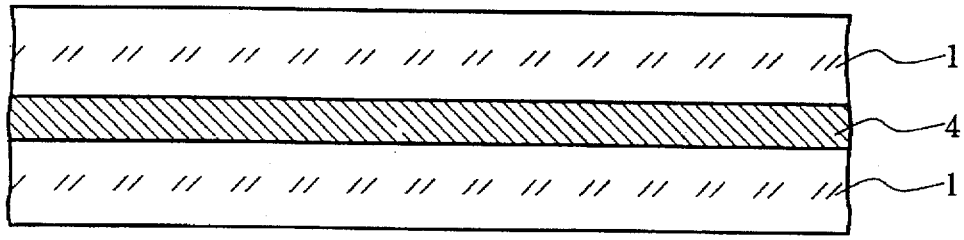
FIG. 2 schematically illustrates a cross-section of a colored film according to another embodiment of the present invention.

In the embodiment illustrated in FIG. 2, a colored adhesive (heat-sealing agent, pressure-sensitive adhesive or the like) layer 4 is interposed between two transparent films 1,1. When the adhesive layer 4 is formed by heat sealing, a solution or dispersion of a thermoplastic resin, which is a heat sealing agent, is coated on one side of one of the transparent films 1 and is then dried to form the colored adhesive layer 4, followed by the bonding of the other transparent film 1 by a laminator such as a hot roll or the like. To adhere the colored film of this embodiment to another object, it is necessary to apply an appropriate adhesive (either colorless or colored) to the outer side of the one or the other transparent film 1 or on a side of the object to which the colored film is to be applied.

Figure 3:
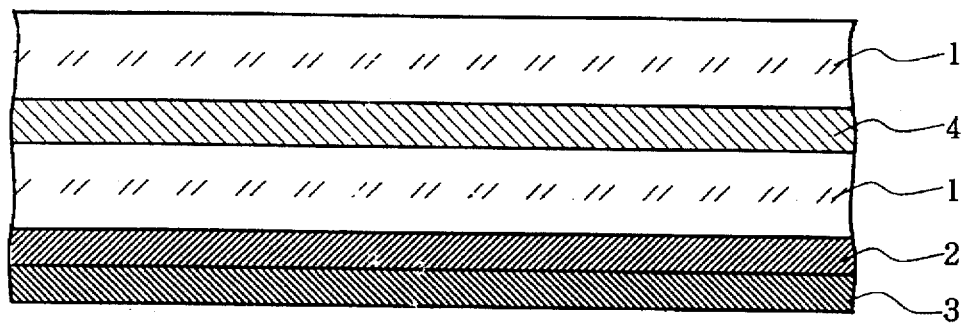
FIG. 3 schematically illustrates a cross-section of a colored film according to a further embodiment of the present invention.

In the embodiment depicted in FIG. 3, a pressure-sensitive adhesive layer 2 is formed on the outer side of one of the transparent films 1,1 and similarly to the embodiment shown in FIG. 1, a release paper 3 is applied to a surface of the adhesive layer 2. The colored film in this embodiment can be formed using in combination the methods employed in FIGS. 1 and 2. In this embodiment, it is only necessary to have at least one of the adhesive layer 4 and the pressure sensitive adhesive layer 2 colored. The colored film can be used similarly to the embodiment of FIG. 1.

Figure 4:
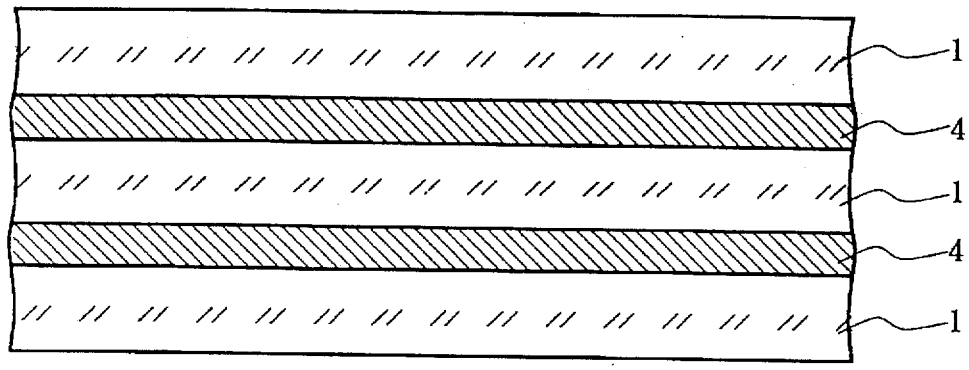
FIG. 4 schematically illustrates a cross-section of a colored film according to a still further embodiment of the present invention.

In the embodiment illustrated in FIG. 4, two colored adhesive layers 4,4 are formed between three transparent films 1,1,1. It is not essential to color both the two layers. Coloring of only one of the adhesive layers may be sufficient. The colored film of this embodiment can be used similarly to the embodiment of FIG. 2.

In each of the above-described embodiments, the shade and light transmittance of the colored film so obtained can be adjusted freely. For example, the degree of the coloring can be adjusted freely by first preparing a colored adhesive of a high pigment concentration and then diluting it with a similar but uncolored adhesive. Alternatively, a colored film having a desired shade can also be obtained by adding the above-described colorant to a colorless adhesive in an amount as much as needed to prepare a colored adhesive having a desired shade and then using the so-obtained adhesive.

The light transmittance can also be adjusted by changing the concentration of the pigment in the colored adhesive layer. When a light-colored film having a low light transmittance is desired, for example, a thin metal deposition film or the like is applied on at least one side of a transparent film. Metal deposition can also be applied irrespective of the degree of coloring where in addition to coloring, infrared ray reflection effects are required. In these cases, it is preferred to use a metal deposited film as a starting transparent film, but metal deposition can be applied after coloring the transparent film into a colored film. Such colored film of the present invention can obviously be imparted with other properties, as required, by employing one or more known techniques in combination.

The colored adhesive can be applied to the transparent film by coating the colored adhesive in the form of a solution in an organic solvent, a dispersion in water, or the like with an appropriate coating means, for example, a known coater such as a knife-over-roll coater, roll coater, reverse coater or gravure coater, optionally followed by drying. Alternatively, a coextrusion process in which the transparent base film and the colored adhesive are extruded simultaneously or a like process can also be used. It is also effective to form the adhesive into a film and then laminate the so-obtained adhesive film with the transparent base film.

The coat weight (or thickness) of the colored adhesive is, in general, about 1 to 50 g/m² in terms of a solid content. This coat weight should be selected and determined considering the concentration of the pigment in the colorant so that desired degrees of coloring and transparency can be obtained.

Incidentally, when the adhesive is a pressure-sensitive one, it is desired to apply a release silicone-coated resin film or a release paper or sheet to a surface of its layer in view of ease in handling.

The present invention will hereinafter be described more specifically by the following Referential Examples, Examples and Comparative Examples, in which all designations of "part" or "parts" and "%" are by weight basis unless otherwise specifically indicated.

REFERENTIAL EXAMPLE 1

| Methyl methacrylate | 5.0 parts |
| Butyl methacrylate | 46.5 parts |

-continued

| Styrene | 38.5 parts |
| N,N-Dimethylaminoethyl methacrylate | 5.0 parts |
| N,N,N-dimethyl-benzylammoniumethyl methacrylate | 5.0 parts |
| Toluene | 500 parts |

The above components were mixed into a solution. In the resulting solution, 2.0 parts of azobisisobutyronitrile were dissolved, followed by polymerization at 85°–90° C. for 5 hours to obtain a viscous polymerization mixture. The toluene was distilled off from the polymerization mixture, whereby a pasty dispersant having a solid content of about 30% was obtained.

REFERENTIAL EXAMPLES 2–7

In a similar manner to Referential Example 1 except that the above monomer composition was changed as shown in Table 1, dispersants were obtained. The dispersants so obtained had the molecular weights shown in Table 2.

TABLE 1

(Unit of each value in the table: part)

| Monomer Composition | Referential Example | | | | | | |
|---|---|---|---|---|---|---|---|
| | 1 | 2 | 3 | 4 | 5 | 6 | 7 |
| Methyl methacrylate | 5.0 | 10 | — | 5 | 5 | 30 | 10 |
| Ethyl acrylate | — | 40 | 5 | — | 5 | — | — |
| Butyl methacrylate methacrylate | 46.5 | — | 40 | 30 | — | 45 | 45 |
| 2-Hydroxyethyl methacrylate | — | — | — | — | 40 | — | — |
| Styrene | 38.5 | 40 | — | — | 30 | — | — |
| α-methylstyrene | — | — | 45 | — | — | — | — |
| Vinyltoluene | — | — | — | 45 | — | — | — |
| Vinylnaphthalene | — | — | — | 10 | — | — | — |
| Vinylanthracene | — | — | — | — | 10 | — | — |
| N,N-dimethylaminoethyl methacrylate | 5.0 | 6 | — | 7 | — | 15 | 35 |
| N,N-diethylaminoethyl acrylate | — | — | 5 | — | 5 | 10 | 10 |
| N,N,N-dimethyl-benzylammonium-ethyl methacrylate | 5.0 | 4 | — | — | 5 | — | — |
| N,N,N-diethyl-methylenenaphthyl-ammoniumethyl methacrylate | — | — | 5 | 3 | — | — | — |

TABLE 2

| Referential Example/ Comparative Example | Molecular weight |
|---|---|
| Referential Example 1 | 15,000 |
| Referential Example 2 | 15,000 |
| Referential Example 3 | 20,000 |
| Referential Example 4 | 10,000 |
| Referential Example 5 | 65,000 |
| Referential Example 6 | 15,000 |
| Referential Example 7 | 20,000 |

REFERENTIAL EXAMPLE 8

In a dispersing mixer, 100 parts of the dispersant which had been obtained in Referential Example 1, 60 parts of a disazo yellow pigment ("Seika Fast Yellow 2720", trade name; product of Dainichiseika Color & Chemicals Mfg. Co., Ltd.) and 240 parts of cyclohexanone were premixed.

The resulting mixture was caused to pass twice through a triple roll mill, whereby a colorant was obtained in the form of a paste.

REFERENTIAL EXAMPLES 9–17

In a similar manner to Referential Example 8 except that the dispersant and the pigment were changed as shown in Table 3, colorants were obtained.

TABLE 3

| Referential Example | Dispersant | Pigment | Solvent | Kneader | Form of colorant |
|---|---|---|---|---|---|
| Referential Example 8 | Referential Example 1: 100 parts | Copper phthalocyanine blue pigment: powder: 60 parts | Cyclohexanone: 240 parts | Triple roll mill | Paste |
| Referential Example 9 | Referential Example 1: 100 parts | Anthraquinone red pigment: powder: 60 parts | Cyclohexanone: 240 parts | Triple roll mill | Paste |
| Referential Example 10 | Referential Example 1: 100 parts | Disazo yellow pigment: powder: 60 parts | Cyclohexanone: 240 parts | Triple roll mill | Paste |
| Referential Example 11 | Referential Example 2: 100 parts | Copper phthalocyanine green pigment: powder: 60 parts | Cyclohexanone: 240 parts | Triple roll mill | Paste |
| Referential Example 12 | Referential Example 3: 100 parts | Carbon black pigment: powder: 60 parts | Cyclohexanone: 240 parts | Triple roll mill | Paste |
| Referential Example 13 | Referential Example 4: 100 parts | Disazo yellow pigment: powder: 60 parts | Cyclohexanone: 240 parts | Triple roll mill | Paste |
| Referential Example 14 | Referential Example 5: 100 parts | Copper phthalocyanine blue pigment: powder: 60 parts | Cyclohexanone: 240 parts | Triple roll mill | Paste |
| Referential Example 15 | Referential Example 6: 100 parts | Copper phthalocyanine blue pigment: powder: 60 parts | Cyclohexanone: 240 parts | Triple roll mill | Paste |
| Referential Example 16 | Referential Example 7: 100 parts | Anthraquinone red pigment: powder: 60 parts | Cyclohexanone: 240 parts | Triple roll mill | Paste |
| Referential Example 17 | Referential Example 6: 100 parts | Disazo yellow pigment: powder: 60 parts | Cyclohexanone: 240 parts | Triple roll mill | Paste |

EXAMPLE 1

An acrylic pressure-sensitive adhesive coating formulation of the following composition was coated on one side of a polyethylene terephthalate film of 25 μm in thickness by a knife-over-roll coater and then dried, whereby a colored film according to the present invention was obtained.

| | |
|---|---|
| Acrylic pressure-sensitive adhesive | 100 parts |
| Colorant (obtained in Referential Example 8) | 4.5 parts |
| Toluene | 16.7 parts |
| Methyl ethyl ketone | 16.7 parts |

EXAMPLES 2–10 AND COMPARATIVE EXAMPLES 1–3

In a similar manner to Example 1 except that the colorants and the transparent films shown in Table 4 were used, colored films according to the present invention were obtained. Incidentally, in Example 6, the same acrylic pressure-sensitive adhesive coating formulation as that employed in Example 1 was coated on a release sheet and dried as in Example 1 to form an adhesive layer and then, the resulting release sheet was laminated on one side of a polycarbonate film so that the side of the adhesive layer was brought into a contiguous relation with the one side of the polycarbonate film, thereby transferring the adhesive layer onto the one side of the polycarbonate film to obtain a colored film according to the present invention.

TABLE 4

| Example/ Comparative Example | Pressure-sensitive adhesive | Colorant (part*[1]) | Transparent film | Coat weight (g/m²) |
|---|---|---|---|---|
| Example 1 | Acrylic | Referential Example 8: 4.5 parts | PET 25 μm | 7 |
| Example 2 | Acrylic | Referential Example 9: 4.5 parts | PET 25 μm | 12 |
| Example 3 | Acrylic | Referential Example 10: 4.5 parts | PET 25 μm | 16 |
| Example 4 | Acrylic | Referential Example 11: 4.5 parts | PET 25 μm | 8 |
| Example 5 | Acrylic | Referential Example 12: 4.5 parts | PET 25 μm | 13 |
| Example 6 | Acrylic | Referential Example 13: 4.5 parts | PC film 25 μm | 16 |
| Example 7 | Acrylic | Referential Example 14: 4.5 parts | PC film 25 μm | 8 |
| Example 8 | Acrylic | Referential Example 8: 4.5 parts | PC film 25 μm | 14 |
| Example 9 | Acrylic | Referential Example 9: 4.5 parts | PP film 25 μm | 18 |
| Example 10 | Acrylic | Referential Example 10: 4.5 parts | PP film 25 μm | 7 |
| Comp. Ex. 1 | Acrylic | Referential Example 15: 4.5 parts | PET 25 μm | 13 |
| Comp. Ex. 2 | Acrylic | Referential Example 16: 4.5 parts | PET 25 μm | 13 |
| Comp. Ex. 3 | Acrylic | Referential Example 17: 4.5 parts | PP film 25 μm | 7 |

*[1]: Amount added per 100 parts of the pressure-sensitive adhesive
PC: polycarbonate
PP: polypropylene

EXAMPLE 11

To 100 parts of a two-part polyurethane resin ("Resamine UND-8380", trade name; product of Dainichiseika Color & Chemicals Mfg. Co., Ltd.), 50 parts of a crosslinking agent ("Resamine NE", trade name; product of Dainichiseika Color & Chemicals Mfg. Co., Ltd.) and 0.5 part of an accelerator ("Resamine HI-215", trade name; product of Dainichiseika Color & Chemicals Mfg. Co., Ltd.) were added and mixed, whereby an autohesive was prepared.

The autohesive so obtained (100 parts) and 5 parts of the colorant obtained in Referential Example 8 were mixed. To the resulting mixture, a 1:1 mixed solvent of toluene and methyl ethyl ketone was added to adjust its viscosity to 3,000 cps (at 25° C.), whereby a coating formulation was prepared. The coating formulation was applied onto one side of a polyethylene terephthalate film of 50 μm in thickness by a knife-over-roll coater to give a dry film thickness of 10 μm and then dried, whereby a colored film according to the present invention was obtained.

COMPARATIVE EXAMPLE 4

In a manner similar to Example 11 except that the colorant obtained in Referential Example 15 was used, a colored film was obtained.

The results of ranking of the colored films obtained in the above Examples and Comparative Examples are shown in Table 5.

TABLE 5

| Colored film | Coloring power | Gloss | Trans- parency | Vividness | Segre- gation | Haze | Light Re- sis- tance |
|---|---|---|---|---|---|---|---|
| Example 1 | A | A | A | A | A | 1.0 | A |
| Example 2 | A | A | A | A | A | 1.7 | A |
| Example 3 | A | A | A | A | A | 1.9 | A |
| Example 4 | A | A | A | A | A | 0.5 | A |
| Example 5 | A | A | A | A | A | 0.6 | A |
| Example 6 | A | A | A | A | A | 0.6 | A |
| Example 7 | A | A | A | A | A | 0.7 | A |
| Example 8 | A | A | A | A | A | 0.7 | A |
| Example 9 | A | A | A | A | A | 0.9 | A |
| Example 10 | A | A | A | A | A | 0.8 | A |
| Example 11 | A | A | A | A | A | 0.8 | A |
| Comp. Ex. 1 | B | B | C | B | B | 20.6 | A |
| Comp. Ex. 2 | B | B | C | B | B | 21.6 | A |
| Comp. Ex. 3 | B | B | C | B | B | 29.3 | A |
| Comp. Ex. 4 | B | B | C | B | B | 23.5 | A |

The ranking in Table 5 was made in accordance with the following standards:
1. Coloring power, gloss, transparency and vividness
   A: Excellent
   B: Good
   C: Fair
   D: Poor
2. Segregation (ranked by a comparison between each coating formulation just after its preparation and the same coating formulation after having been allowed to stand for 15 hours)
   A: No segregation was observed.
   B: Segregation was observed.
3. Haze $$\text{Haze} = \frac{\text{Diffused transmittance (\%)}}{\text{Total transmittance (\%)}} \times 100$$

4. Light resistance
   Each sample was exposed to light from a Sunshine-type fadeometer and a color difference ΔE after exposure for 500 hours was measured. Each sample whose color difference ΔE was 2.0 or smaller was ranked "A".

What is claimed is:

1. A colored film formed of a transparent film and at least one colored adhesive layer applied on one side of the transparent film, characterized in that the adhesive layer has been colored by a colorant composed of a pigment and a dispersant, and said dispersant comprises a (meth) acrylate ester polymer formed, as essential monomer components, of an aromatic vinyl monomer, a primary to tertiary amino-containing (meth) acrylate ester monomer and a (meth) acrylate ester monomer containing an ammonium group quaternized with an aromatic compound, wherein the proportions of the monomers forming the dispersant fall within the following ranges:
   the (meth) acrylate ester monomer:
      0 to 70 parts by weight
   the aromatic vinyl monomer:
      0 to 60 parts by weight
   the primary to tertiary amino-containing (meth)acrylate ester monomer:
      2 to 15 parts by weight; and
   the quaternized-ammonium-containing (meth)acrylate ester monomer
      1 to 10 parts by weight.

2. A colored film according to claim 1, wherein the adhesive layer comprises a pressure-sensitive adhesive.

3. A colored film according to claim 1, wherein the adhesive layer comprises a heat-sensitive adhesive.

4. A colored film according to claim 1, wherein the adhesive layer comprises an autohesive layer.

5. A colored film according to claim 1, wherein the aromatic vinyl monomer is selected from styrene, vinyl naphthalene or vinyl anthracene, or a derivative thereof.

6. A colored film according to claim 1, wherein the primary to tertiary amino-containing (meth)acrylate ester monomer is a dialkylaminoalkyl (meth)acrylate.

7. A colored film according to claim 1, wherein the (meth)acrylate ester monomer containing the ammonium group quaternized with the aromatic compound is a dialkylaminoalkyl (meth)acrylate quaternized with an aromatic compound.

8. A colored film according to claim 1, wherein the colorant comprises 10 to 500 parts by weight of the dispersant per 100 parts by weight of the pigment.

9. A colored film according to claim 1, wherein the colored adhesive layer comprises 0.1 to 10 parts by weight of the colorant per 100 parts by weight of the adhesive.

10. A colored film according to claim 1, which is suitable for use in adhesion onto a window.

11. A colored film according to claim 1, wherein the proportions of the monomers forming the dispersant fall within the following ranges:
   the (meth) acrylate ester monomer:
      0 to 70 parts by weight
   the aromatic vinyl monomer:
      20 to 50 parts by weight
   the primary to tertiary amino-containing (meth) acrylate ester monomer:
      5 to 10 parts by weight; and
   the quaternized-ammonium-containing (meth) acrylate ester monomer
      3 to 8 parts by weight.

* * * * *

UNITED STATES PATENT AND TRADEMARK OFFICE
CERTIFICATE OF CORRECTION

PATENT NO. : 5,683,805
DATED : November 4, 1997
INVENTOR(S) : Katsuyuki Oita et al.

It is certified that error appears in the above-identified patent and that said Letters Patent is hereby corrected as shown below:

Column 12,
Line 20, replace "0" with -- 10 --

Signed and Sealed this

Eighteenth Day of January, 2005

JON W. DUDAS
*Director of the United States Patent and Trademark Office*